Aug. 1, 1950   W. KLINGER   2,517,116
PLASTIC-REINFORCED BOWLING PIN
Filed Sept. 2, 1948
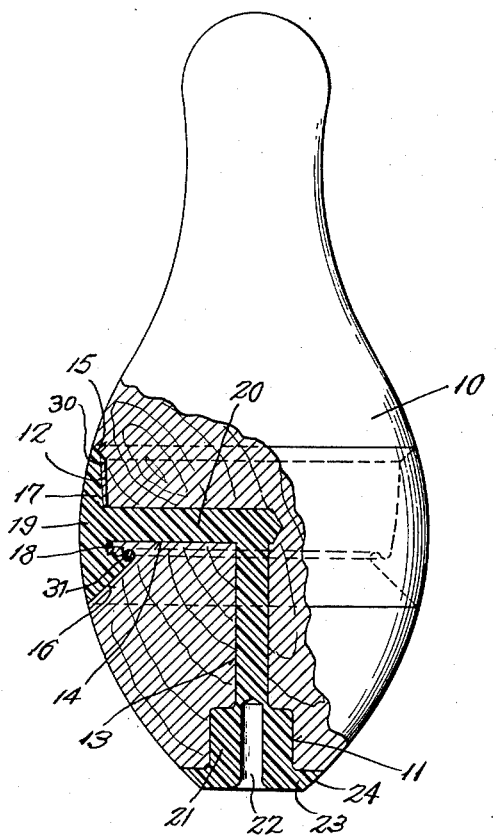
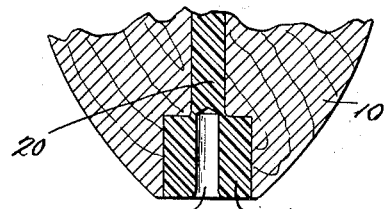
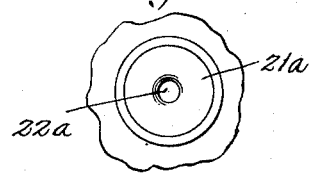
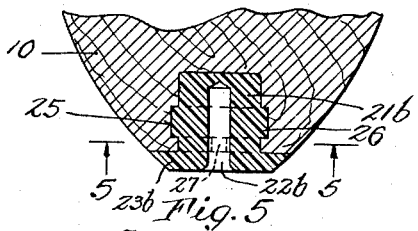
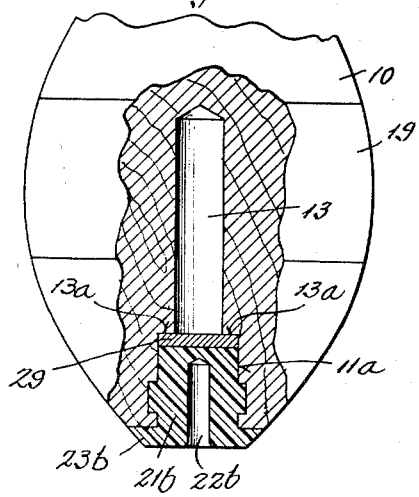
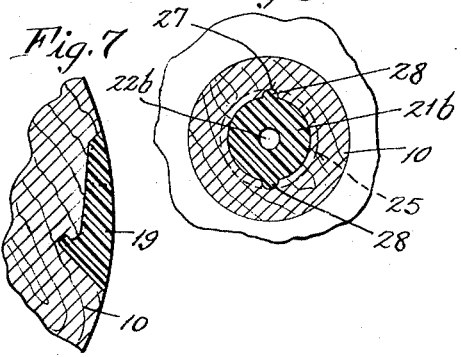
INVENTOR.
Walter Klinger
BY
Johnson and Kline
ATTORNEYS Patented Aug. 1, 1950

2,517,116

UNITED STATES PATENT OFFICE 2,517,116

PLASTIC-REINFORCED BOWLING PIN

Walter Klinger, Fairfield, Conn.

Application September 2, 1948, Serial No. 47,359

7 Claims. (Cl. 273—82)

The present invention relates to bowling pins and particularly to pins which are provided with molded-in bands of hard, wear-resisting, impact-resisting, plastic material in the belly of the pin and/or having molded-in inserts of similar plastic material in the base.

Bowling pins have heretofore been provided with a fiber insert secured to the base of the pin by adhesives, force fit, or screws and having the spotting pin receiving recess therein. These inserts, however, through continual impact of the ball with the pin become loosened and render the pin unfit for use.

The present invention overcomes this difficulty by providing a molded-in base insert which is mechanically interlocked with the body of the pin so as to be held therein permanently and cannot be loosened by impacts of the ball against the pin.

In one form of the invention, the inserts are molded directly in the bore in the end of the pin with interlocking means extending around the bore.

In another form of the invention an insert is connected within the pin to a plastic band molded in a groove about the belly of the pin so as to be integral therewith. This connection serves to anchor both the band and insert to the body of the pin.

A feature of the present invention is a novel band construction which is so constructed and disposed about the belly of the pin as to have its maximum thickness at the point of contact with the ball and is so positioned in the groove about the belly of the pin as to withstand shocks given the band by the ball, which shocks would normally chip the wood of the pin adjacent the band.

If desired, the bottom of the band-receiving groove can be provided with an impact-receiving or buffer means to further reduce the shock of the ball striking the pin.

The insert in the base of the pin can lie wholly within the end of the pin or it may be provided with a flange overlying the base of the pin and is so secured in the bore in the base of the pin as to prevent both longitudinal and rotary movement with respect to the body of the pin.

Other features and advantages of the invention will be apparent from the specification and claims when considered in connection with the drawings in which:

Figure 1 shows a view of a pin partly in section showing the band and insert interconnected.

Fig. 2 is a detailed view of the bottom of a pin similar to Fig. 1 showing another form of insert.

Fig. 3 is a fragmentary bottom view of Fig. 2.

Fig. 4 is a fragmentary sectional view showing the insert in the base of the pin.

Fig. 5 is a sectional view taken along line 5—5 of Fig. 4.

Fig. 6 is a view partly in section of another form of base insert.

Fig. 7 is a fragmentary sectional view taken through the band showing the buffer strips omitted from the bottom of the grooves.

As shown in the drawings, the bowling pin, which may be a duck pin, ten pin or other similar device, has a body 10, preferably of wood, provided with a bore 11 in the base, a groove 12 extending around the belly portion of the pin, and a passageway 13, 14 connecting the bore and groove.

In the preferred form of the invention, the passage 13 is formed by extending the bore 11 axially of the body to intersect passage 14 which is drilled radially of the pin from the groove 12.

The groove 12 is provided with a pair of inwardly tapering side walls 15, 16 and a bottom wall 17. The end wall 16 extends inwardly beyond the bottom and provides an undercut 18 therein as is clearly shown in Fig. 1.

A band of hard, wear-resisting, impact-resisting plastic material 19, such as cellulose acetate, ethyl cellulose and the like materials, is molded in the groove with the material extending into the undercut recess so as to interlock the band with the pin. As shown, the band 19 has its outer surface formed as a continuation of the curve of the body of the pin and is progressively thicker from top to bottom of the band so that it has a maximum of material in the band at the point of impact of the ball with the pin, which point of impact is slightly below the maximum diameter of the body of the pin.

At the same time that the band is formed the plastic material is molded in the bore 11 to form the insert 21 and the plastic flows through the passage and forms a connection 20 between the band and insert. Thus, it will be seen that the band, base insert and connection between the two are formed and tied together in a simple molding operation. The connection 20 extending between the insert and the band holds the band against rotation on the body and holds the insert against longitudinal movement and rotation on the body.

In the form of the invention shown in Fig. 1, the base insert is provided with the usual spotting pin-receiving recess 22 and the flange 23 overlying the bottom of the pin with its outer edge 24 forming a continuation of the curvature of the surface of the body of the pin.

Instead of forming the base insert with a flange as shown in Fig. 1, it may be formed as an insert 21a lying wholly within the end of the pin and connected to the portion 20 as shown in Fig. 2. Insert 21a is provided with the spotting pin-receiving recess 22a. This insert, too, will be held against longitudinal movement and rotary movement by the connector 20.

In some cases it may be desired to provide merely the inserts in the base of the pin, which inserts will not readily loosen or fall from the pin from under the severe impact which the pins receive. Such an insert is shown in Figs. 4 and 5 wherein the bore of the pin is provided with a recess or groove 25 in the walls thereof extending transversely of the pin and the insert 21b molded into the base has formed integrally therewith a projection or rib 26 which extends into the recess or groove and interlocks therewith to prevent the insert 21b from moving longitudinally of the pin. The body and insert can be provided with key means for preventing rotation of the insert. This can be a notch 27 in the body which receives the plastic rib 28 formed integrally with the insert during the molding thereof. This insert may also be provided with the usual spotting pin-receiving aperture 22b therein and have a flange 23b thereon. In order to obtain proper balance or weighting of the pin it may be desired to remove some of the wood in the center of the pin. As shown in Fig. 6 the passage 13 may be used for this purpose. It is provided with shoulders 13a at the end of the insert-receiving bore 11a and a plate 29 of metal or the like material is inserted in the bore 11a to close the passage 13. The bore 11a is formed similar to that of the form of the invention shown in Figs. 4 and 5 so that the insert when molded therein will be interlocked with the body and extend from the plate to the end of the body.

In some cases it may be preferred to provide the band with shock-absorbing means. This can be accomplished by positioning buffer means, such as a cork strip or padding 30 so as to overlie the bottom of the groove and padding 31 to overlie the inner end of the undercut as shown in Fig. 1. These will assist the plastic in taking up the impact of the ball thereagainst during play.

If, due to the nature of the plastic, it is not desired to have a buffer then the band may be molded directly in contact with the bottom of the groove as shown in Fig. 7.

Variations and modifications may be made within the scope of this invention and portions of the improvements may be used without others.

I claim:

1. In a bowling pin, a body having a groove about the belly portion thereof, a bore in the base, and a passage connecting said groove and bore; a band in said groove having the outer surface thereof a continuation of the surface of said body; an insert in the bore in said base; and an integral connection between said band and insert extending through said passage.

2. In a bowling pin, a body having a groove about the belly portion thereof, a bore in the base, and a passage connecting said groove and bore; and a molded band of plastic material in said groove, and a molded insert of plastic material in said base, said band and insert being integrally connected through said passage.

3. In a bowling pin, a body having an undercut groove about the belly thereof and extending above and below the maximum diameter of the pin, a bore in the base, and a passage connecting said groove and bore; buffer means overlying the bottom of the groove and the undercut; and a molded band of hard plastic material in said groove, and a molded insert of hard plastic material in said base, said band and insert being in interconnected relation through said passage.

4. In a bowling pin, a body having a groove about the belly portion thereof, a bore in the base, and a passage connecting said groove and bore; a band in said groove having the outer surface thereof a continuation of the surface of said body; an insert in the bore in said base and having a flange overlying the end of the base; and an integral connection between said band and insert extending through said passage.

5. In a bowling pin, a body having a groove about the belly thereof extending above and below the maximum diameter of the pin, said groove having an undercut portion therein adjacent at least one edge thereof, and a band in said groove having a portion interlocked with the undercut and having an outer surface flush with the surface of the body of the pin, the band increasing in thickness from top to bottom thereof.

6. In a bowling pin, a body having a groove about the belly thereof and extending above and below the maximum diameter of the pin, said groove having inwardly tapering side walls, the lower side wall extending below the bottom of the groove to form an undercut therein, and a band in said groove interlocked with the undercut and having an outer surface flush with the surface of the body of the pin, the band increasing in thickness from top to bottom thereof.

7. In a bowling pin, a body having a groove about the belly portion thereof, a bore in the base, and a passage connecting said groove and bore; a resilient buffer member overlying the bottom of the groove; a band in said groove having the outer surface thereof a continuation of the surface of said body; an insert in the bore in said base; and an integral connection between said band and insert extending through said passage.

WALTER KLINGER.

REFERENCES CITED

The following references are of record in the file of this patent:

UNITED STATES PATENTS

| Number | Name | Date |
|---|---|---|
| 649,745 | Niemeyer | May 15, 1900 |
| 814,257 | Wilson | Mar. 6, 1906 |
| 846,164 | Teetor | Mar. 5, 1907 |
| 1,078,223 | Suss | Nov. 11, 1913 |
| 1,679,072 | Carmichael | July 31, 1928 |
| 1,843,261 | Bales | Feb. 2, 1932 |
| 1,969,378 | McKenzie | Aug. 7, 1934 |
| 2,199,310 | Hartley | Apr. 30, 1940 |
| 2,202,674 | Seaman et al. | May 28, 1940 |
| 2,446,213 | Clark et al. | Aug. 3, 1948 |